United States Patent
Fujiune

(10) Patent No.: US 10,122,976 B2
(45) Date of Patent: Nov. 6, 2018

(54) PROJECTION DEVICE FOR CONTROLLING A POSITION OF AN IMAGE PROJECTED ON A PROJECTION SURFACE

(71) Applicant: Panasonic Intellectual Property Management Co., Ltd., Osaka (JP)

(72) Inventor: Kenji Fujiune, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 363 days.

(21) Appl. No.: 14/964,617

(22) Filed: Dec. 10, 2015

(65) Prior Publication Data

US 2016/0188123 A1    Jun. 30, 2016

(30) Foreign Application Priority Data

Dec. 25, 2014  (JP) ................................. 2014-263637
Nov. 20, 2015  (JP) ................................. 2015-227172

(51) Int. Cl.
*H04N 9/31* (2006.01)
*G03B 21/14* (2006.01)
(Continued)

(52) U.S. Cl.
CPC ........... *H04N 9/3147* (2013.01); *G03B 17/54* (2013.01); *G03B 21/145* (2013.01); *G06F 3/005* (2013.01);
(Continued)

(58) Field of Classification Search
CPC .. H04N 9/3147; H04N 9/3194; G06F 3/0425; G06F 3/011; G06F 3/017; G03B 21/26;
(Continued)

(56) References Cited

U.S. PATENT DOCUMENTS 7,134,080 B2 * 11/2006 Kjeldsen ................ G03B 21/28
                                                      715/730
7,259,747 B2 *  8/2007 Bell ....................... G03B 21/26
                                                      345/156
(Continued)

FOREIGN PATENT DOCUMENTS

JP         10-123938        5/1998
JP        2004-306779      11/2004
(Continued)

*Primary Examiner* — Bao-Luan Le
(74) *Attorney, Agent, or Firm* — Wenderoth, Lind & Ponack, L.L.P.

(57) ABSTRACT

A projection device includes: a detection unit configured to detect a specific object; a projection unit configured to project a first projection image; a drive unit configured to change a direction of the projection unit so as to change the projection position of the first projection image; a controller configured to control the drive unit such that the first projection image is projected while following the motion of the detected specific object; and a communication unit configured to receive information of a second projection image projected by another projection device. The controller acquires information relating to a position of the second projection image through the communication unit, and controls a projection method of the first projection image based on the positions of the first projection image and the second projection image such that the first projection image and the second projection image are not overlapped with each other when they are projected.

5 Claims, 14 Drawing Sheets

(51) Int. Cl.
  *G03B 17/54* (2006.01)
  *G06F 3/00* (2006.01)
(52) U.S. Cl.
  CPC ......... *H04N 9/3114* (2013.01); *H04N 9/3158* (2013.01); *H04N 9/3194* (2013.01)
(58) Field of Classification Search
  CPC ..... G06T 19/006; H04S 7/303; G01C 21/206; G09F 19/18
  See application file for complete search history.

(56) References Cited

U.S. PATENT DOCUMENTS

| | | | | |
|---|---|---|---|---|
| 7,292,252 B2 * | 11/2007 | Matsuda | ................ | H04N 5/74 345/589 |
| 7,530,019 B2 * | 5/2009 | Kjeldsen | ................ | G03B 21/28 715/730 |
| 7,576,727 B2 * | 8/2009 | Bell | ................ | G06F 3/011 345/156 |
| 7,775,883 B2 * | 8/2010 | Smoot | ................ | A63F 13/00 463/30 |
| 7,834,846 B1 * | 11/2010 | Bell | ................ | G06F 3/011 345/156 |
| 8,199,108 B2 * | 6/2012 | Bell | ................ | G06F 3/011 345/156 |
| 8,300,042 B2 * | 10/2012 | Bell | ................ | G06F 3/011 345/156 |
| 8,454,173 B2 * | 6/2013 | Nakamura | ............ | G03B 21/14 345/1.3 |
| 8,589,796 B2 * | 11/2013 | Moesgaard Kjeldsen | ................... | H04N 5/74 715/730 |
| 8,641,195 B2 * | 2/2014 | Wakabayashi | ....... | G02B 26/101 353/28 |
| 8,840,250 B1 * | 9/2014 | Yao | ................ | G01S 17/46 345/633 |
| 8,887,043 B1 * | 11/2014 | Pollack | ................ | G06F 3/0304 345/108 |
| 8,902,158 B2 * | 12/2014 | Willis | ................ | H04N 9/3147 345/156 |
| 8,933,974 B1 * | 1/2015 | Marason | ................ | G09G 3/002 345/690 |
| 8,964,292 B1 * | 2/2015 | Marason | ................ | G03B 21/60 359/449 |
| 8,992,050 B1 * | 3/2015 | Yuan | ................ | G03B 21/14 362/293 |
| 9,052,579 B1 * | 6/2015 | Poulad | ................ | G03B 21/145 |
| 9,118,782 B1 * | 8/2015 | Coley | ................ | H04N 5/00 |
| 9,124,786 B1 * | 9/2015 | Coley | ................ | H04N 5/222 |
| 9,132,346 B2 * | 9/2015 | Huebner | ................ | G06T 15/20 |
| 9,195,127 B1 * | 11/2015 | Marason | ................ | G03B 21/28 |
| 9,204,121 B1 * | 12/2015 | Marason | ............ | G01B 11/2513 |
| 9,262,983 B1 * | 2/2016 | Coley | ................ | G09G 5/00 |
| 9,281,727 B1 * | 3/2016 | Coley | ................ | G09G 3/002 |
| 9,282,301 B1 * | 3/2016 | Cederlof | ................ | H04N 9/3147 |
| 9,418,558 B1 * | 8/2016 | Stamenkovich | ......... | G08G 3/02 |
| 9,508,137 B2 * | 11/2016 | Byers | ................ | H04L 65/1083 |
| 9,508,194 B1 * | 11/2016 | Worley, III | ............ | G06F 3/011 |
| 9,588,408 B1 * | 3/2017 | Linnell | ................ | G03B 21/14 |
| 2002/0186221 A1 * | 12/2002 | Bell | ................ | G03B 21/26 345/474 |
| 2004/0036717 A1 * | 2/2004 | Kjeldsen | ................ | G03B 21/28 715/730 |
| 2004/0036813 A1 * | 2/2004 | Matsuda | ................ | H04N 5/74 348/744 |
| 2004/0102247 A1 * | 5/2004 | Smoot | ................ | A63F 13/00 463/36 |
| 2004/0183775 A1 * | 9/2004 | Bell | ................ | G06F 3/011 345/156 |
| 2007/0013716 A1 * | 1/2007 | Kjeldsen | ................ | G03B 21/28 345/594 |
| 2008/0024514 A1 * | 1/2008 | Matsuda | ................ | H04N 5/74 345/589 |
| 2008/0062123 A1 * | 3/2008 | Bell | ................ | G06F 3/011 345/156 |
| 2008/0218641 A1 * | 9/2008 | Kjeldsen | ................ | G03B 21/28 348/746 |
| 2009/0207322 A1 | 8/2009 | Mizuuchi et al. | | |
| 2010/0026624 A1 * | 2/2010 | Bell | ................ | G06F 3/011 345/156 |
| 2011/0116055 A1 * | 5/2011 | Nakamura | ............ | G03B 21/14 353/82 |
| 2011/0205497 A1 * | 8/2011 | Wakabayashi | ....... | G02B 26/101 353/28 |
| 2013/0100009 A1 * | 4/2013 | Willis | ................ | H04N 9/3147 345/156 |
| 2013/0229396 A1 * | 9/2013 | Huebner | ............ | H04N 9/3147 345/207 |
| 2013/0265502 A1 * | 10/2013 | Huebner | ............ | G06T 15/20 348/789 |
| 2015/0317835 A1 * | 11/2015 | Byers | ................ | H04L 65/1083 345/633 |

FOREIGN PATENT DOCUMENTS

| | | |
|---|---|---|
| JP | 2005-115270 | 4/2005 |
| JP | 2008-145541 | 6/2008 |
| JP | 2013-141207 | 7/2013 |
| JP | 2014-153666 | 8/2014 |
| JP | 2014-224871 | 12/2014 |
| WO | 2006/077665 | 7/2006 |
| WO | 2008/004438 | 1/2008 |

* cited by examiner

PROJECTION DEVICE FOR CONTROLLING A POSITION OF AN IMAGE PROJECTED ON A PROJECTION SURFACE

BACKGROUND

1. Technical Field

The present disclosure relates to a projection device that detects a predetermined object, and projects an image by following the detected object.

2. Description of the Related Art

Unexamined Japanese Patent Publication No. 2005-115270 discloses a moving body attached information display device including a video camera that images a moving body passing a background defined within a fixed frame on a wall surface or on a floor surface, an image processor which sequentially extracts position coordinates of the moving body entering the current image sequentially imaged by the video camera, calculates position coordinates for display away from the respective position coordinates on the basis of the respective position coordinates, and sequentially inserts information of a text, an image, etc., into the respective position coordinates for display in a prescribed display size to output the result as video information, and a video display device having a display screen on the wall surface or floor surface, and displaying the video information of the text, image, etc. of prescribed display size on the display screen according to the movement of the moving body.

According to the video display device disclosed in Unexamined Japanese Patent Publication No. 2005-115270, two or more moving bodies can be recognized by only one video camera, and the information presented with the recognized two or more moving bodies can independently be displayed.

SUMMARY

A projection device according to the present disclosure includes: a detection unit configured to detect a specific object; a projection unit configured to project a first projection image; a drive unit configured to change a direction of the projection unit so as to change a projection position of the first projection image; a controller configured to control the drive unit such that the first projection image is projected while following the motion of the specific object detected by the detection unit; and a communication unit configured to receive information of a second projection image projected by another projection device. The controller acquires information relating to a position of the second projection image through the communication unit, and controls a projection method of the first projection image based on the positions of the first projection image and the second projection image such that the first projection image and the second projection image are not overlapped with each other when they are projected.

DETAILED DESCRIPTION

Exemplary embodiments will be described in detail below with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art.

Note that the accompanying drawings and the following description are provided by the applicant in order for a person of ordinary skill in the art to sufficiently understand the present disclosure, and they are not intended to limit the subject matter set forth in the claims.

First Exemplary Embodiment

A first exemplary embodiment will be described below with reference to the accompanying drawings. In the description below, a projector device will be described as a specific exemplary embodiment of a projection device according to the present disclosure.

[1-1. Brief Summary]

Figure 1:
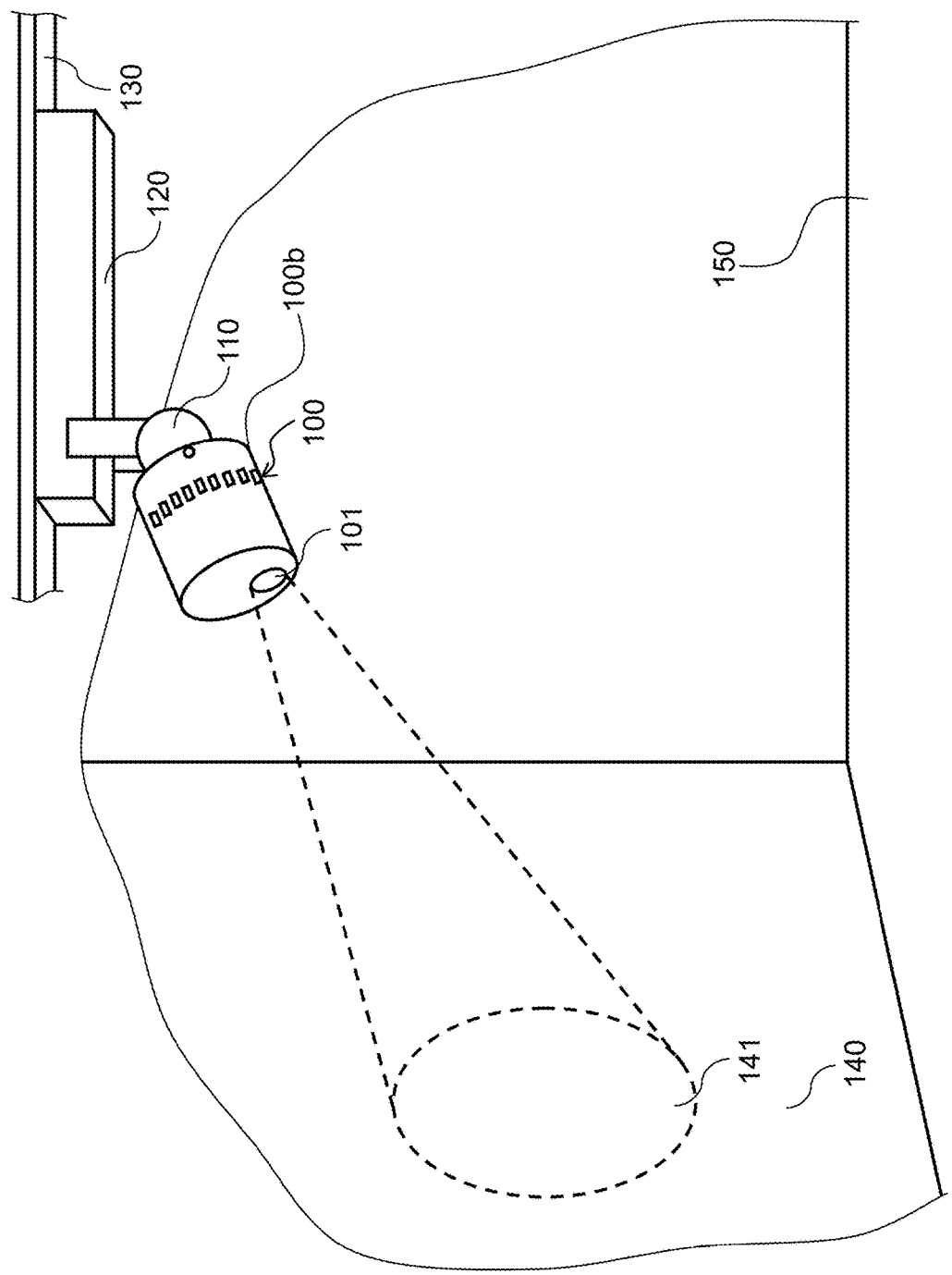
FIG. 1 is a schematic diagram illustrating a state in which a projector device projects an image onto a wall surface.
Figure 2:
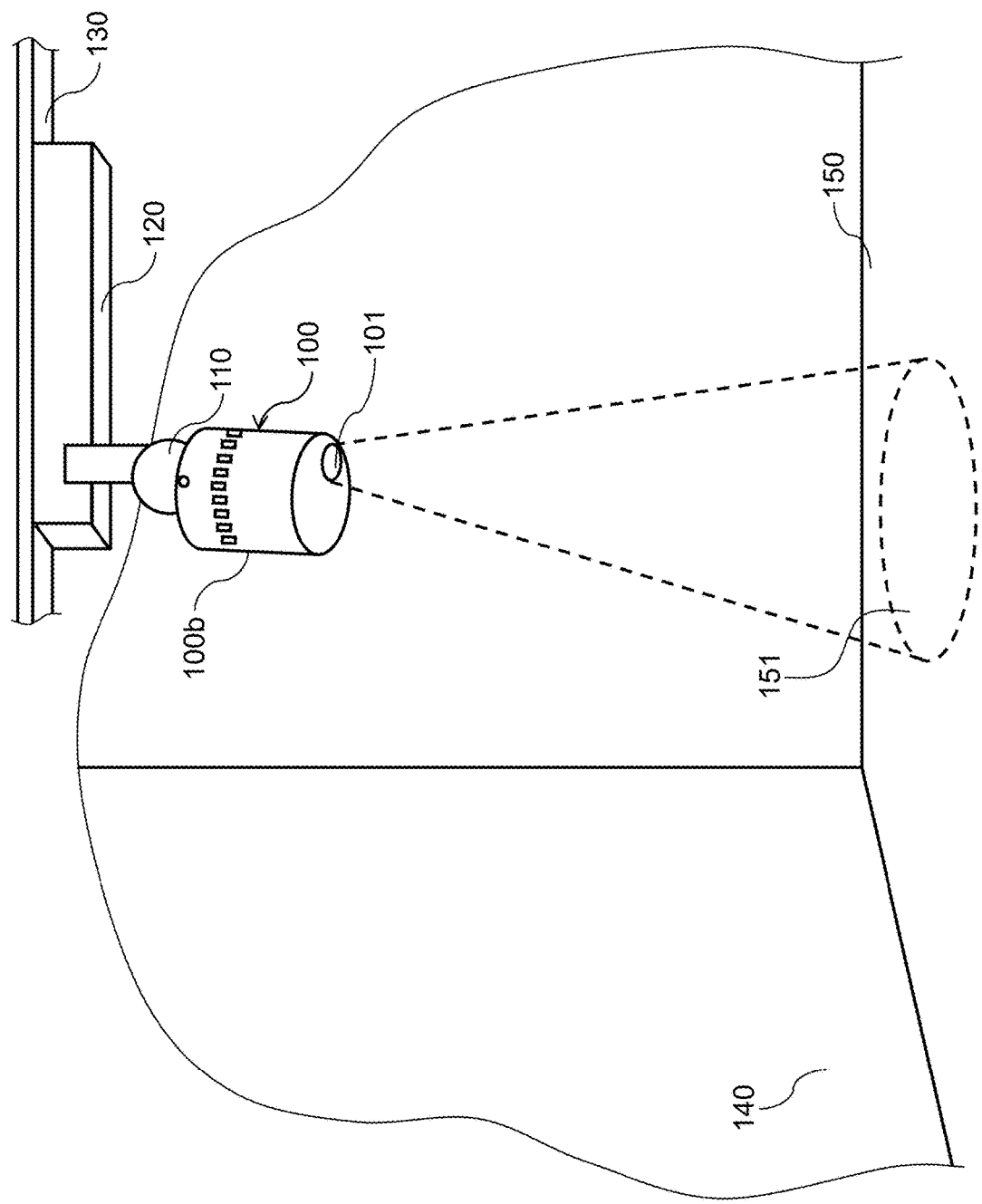
FIG. 2 is a schematic diagram illustrating a state in which the projector device projects an image onto a floor surface.

A brief image projection operation with projector device 100 will be described with reference to FIGS. 1 and 2. FIG. 1 is a conceptual diagram illustrating that projector device 100 projects an image onto a wall surface. FIG. 2 is a conceptual diagram illustrating that projector device 100 projects an image onto a floor surface.

As illustrated in FIGS. 1 and 2, projector device 100 is fixed to housing 120 with drive unit 110. Wiring lines electrically connected to projector body 100*b* and respective units composing drive unit 110 are connected to a power source via housing 120 and wiring duct 130. With this, electric power is supplied to projector body 100*b* and drive unit 110. Projector device 100 has opening 101 on projector body 100*b*. Projector device 100 projects an image through opening 101.

Drive unit 110 drives projector device 100 to change the direction (orientation) of projector body 100*b*, thereby being capable of changing a projection direction of projector device 100. As illustrated in FIG. 1, drive unit 110 can drive projector device 100 such that the projection direction of projector device 100 matches a direction toward wall 140. Thus, projector device 100 can project image 141 on wall 140. Similarly, as illustrated in FIG. 2, drive unit 110 can drive projector device 100 such that the projection direction of projector device 100 matches a direction toward floor surface 150. Thus, projector device 100 can project image 151 on floor surface 150. Drive unit 110 may drive projector device 100 based on a user's manual operation or automatically drive projector device 100 according to a detection result of a predetermined sensor. Image 141 which is to be projected on wall 140 and image 151 which is to be projected on floor surface 150 may be different from each other or the same as each other. Drive unit 110 includes an electric motor, and can change the direction (orientation) of projector device 100 to change the projection direction or projection position of the image by swinging projector body 100*b* in a horizontal direction (pan direction) and vertical direction (tilt direction).

Projector device 100 can detect a specific object, and project an image (content) at a position or in a region having a predetermined positional relation based on the position of the specified object by following the motion of the detected object. Notably, a "person" is detected as the specific object below. A control for projecting an image by following a motion of a detected person is referred to as a "person following control".

[1-2. Configuration]

Figure 3:
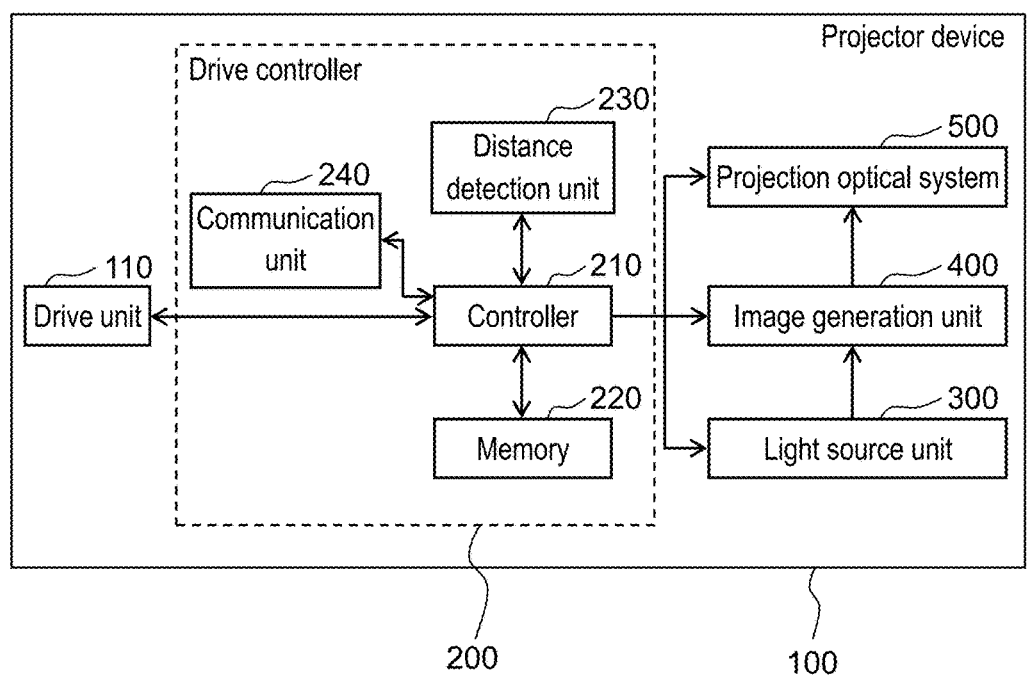
FIG. 3 is a block diagram illustrating an electrical configuration of the projector device.

The configuration and operation of projector device 100 will be described in detail below. FIG. 3 is a block diagram illustrating an electrical configuration of projector device 100. Projector device 100 includes drive controller 200, light source unit 300, image generation unit 400, and projection optical system 500. The configuration of each unit composing projector device 100 will sequentially be described below.

Drive controller 200 includes controller 210, memory 220, distance detection unit 230, and communication unit 240.

Controller 210 is a semiconductor element that generally controls projector device 100. Specifically, controller 210 controls the operations of distance detection unit 230, memory 220, and the like composing drive controller 200, and the operations of light source unit 300, image generation unit 400, and projection optical system 500. Controller 210 can also perform a digital zoom control for zooming in or zooming out a projection image with a video signal process, or perform a geometric correction to the projection image in consideration of a direction of a projection plane. Controller 210 also controls drive unit 110 to change a projection direction or projection position of projection light from projector device 100. Controller 210 acquires, from drive unit 110, information relating to the current control position of drive unit 110 in a pan direction and a tilt direction, and information relating to a speed when drive unit 110 changes the direction of projector body 100*b* in the pan direction and the tilt direction. Controller 210 may be implemented only with hardware, or with a combination of hardware and software. For example, controller 210 can include one or more CPUs or MPUs.

Memory 220 is a memory element storing various information pieces. Memory 220 includes a flash memory or a ferroelectric memory. Memory 220 stores a control program and the like for controlling projector device 100. Memory 220 also stores various information pieces supplied from controller 210. Memory 220 also stores image data of a still image or a moving image which is to be projected, a reference table including settings such as a position on which an image is to be projected or a projection size, and shape data of an object to be detected.

Distance detection unit 230 includes a distance image sensor of a TOF (Time-of-Flight) system (hereinafter referred to as a "TOF sensor"), for example. This sensor linearly detects a distance to a projection plane or to an object which is opposite thereto. When facing wall 140, distance detection unit 230 detects a distance from distance detection unit 230 to wall 140. If a picture is on wall 140, distance detection unit 230 can detect the distance to the front surface of the picture. Similarly, when facing floor surface 150, distance detection unit 230 detects a distance from distance detection unit 230 to floor surface 150. If an object is placed on floor surface 150, distance detection unit 230 can detect the distance to the surface of the object.

Communication unit 240 is a module that performs communication with another projector device in accordance with a predetermined communication standard. Communication unit 240 may perform communication with another projector device through a wired communication network or a wireless communication network. For example, communication unit 240 performs data communication in accordance with standards including wireless LAN, WiFi, and Bluetooth.

Figure 4A:
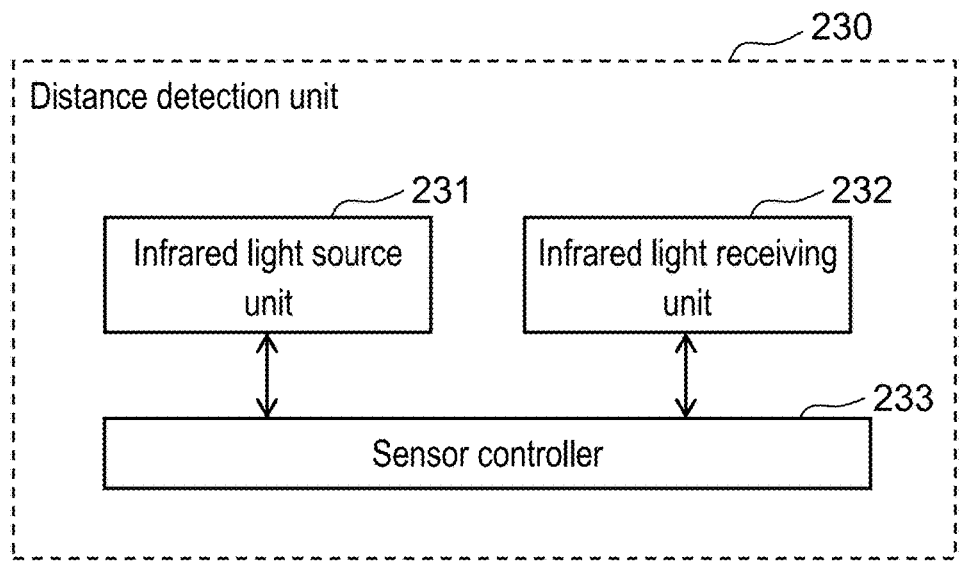
FIG. 4A is a block diagram illustrating an electrical configuration of a distance detection unit.

FIG. 4A is a block diagram illustrating the electrical configuration of distance detection unit 230. As illustrated in FIG. 4A, distance detection unit 230 includes infrared light source unit 231 that emits infrared detection light, infrared light receiving unit 232 that receives infrared detection light reflected on an opposed plane (or object), and sensor controller 233. Infrared light source unit 231 emits infrared detection light through opening 101 such that the infrared detection light is diffused completely around projector device 100. For example, infrared light source unit 231 uses infrared light with a wavelength of 850 nm to 950 nm as the infrared detection light. Controller 210 stores the phase of the infrared detection light emitted from infrared light source unit 231 in an internal memory. When the opposed plane is not equidistant from distance detection unit 230, and has a tilt or a shape, each of a plurality of pixels arrayed on the imaging plane of infrared light receiving unit 232 receives reflection light at different timings. Since each of the plurality of pixels receives reflection light at different timings, the infrared detection light received by infrared light receiving unit 232 has a different phase in each pixel. Sensor controller 233 stores the phase of the infrared detection light received by each pixel in infrared light receiving unit 232 in the memory.

Sensor controller 233 reads the phase of the infrared detection light emitted from infrared light source unit 231 and the phase of the infrared detection light received by each pixel in infrared light receiving unit 232 from the memory. Sensor controller 233 measures the distance to the opposed plane from distance detection unit 230 to generate distance information (distance image) based on the phase difference between the infrared detection light emitted from distance detection unit 230 and the received infrared detection light.

Figure 4B:
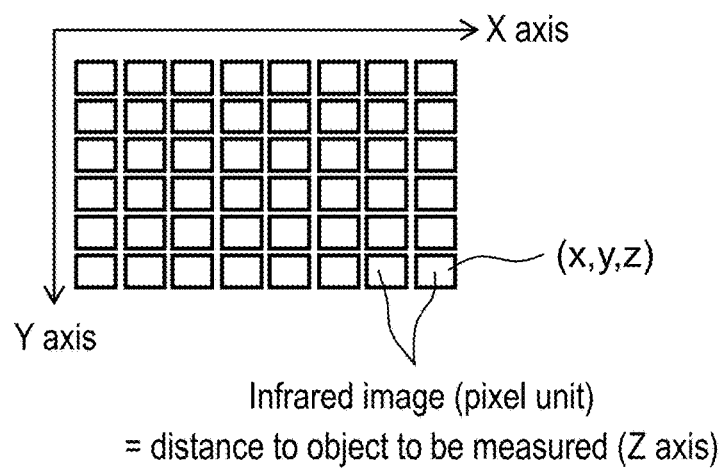
FIG. 4B is a diagram for describing distance information acquired by the distance detection unit.

FIG. 4B is a diagram for describing distance information generated by infrared light receiving unit 232 in distance detection unit 230. Distance detection unit 230 detects a distance to an object reflecting the infrared detection light based on the above phase difference for each of the pixels forming an infrared image with the received infrared detection light. With this, sensor controller 233 can acquire the detection result about the distance for the entire region of the angle of view of the infrared image received by distance detection unit 230 on a pixel basis. Controller 210 can acquire distance information from distance detection unit 230.

Controller 210 can detect a projection plane such as wall 140 or floor surface 150, or a specific object such as a person or an object, based on the distance information.

A TOF sensor is illustrated above as an example of distance detection unit 230. However, the present disclosure is not limited thereto. Specifically, distance detection unit 230 may be one that illuminates a known pattern such as a random dot pattern, and calculates distance based on deviation of the pattern, or may be one that utilizes disparity of a stereo camera. In addition, projector device 100 may have a RGB camera, not illustrated, in addition to distance detection unit 230. In such case, projector device 100 may detect an object by using image information output from the RGB camera as well as the distance information output from the TOF sensor. With use of the RGB camera, an object can be detected by using information such as a color of the object or characters written on the object as well as information about a three-dimensional shape of the object acquired from the distance information.

Figure 5:
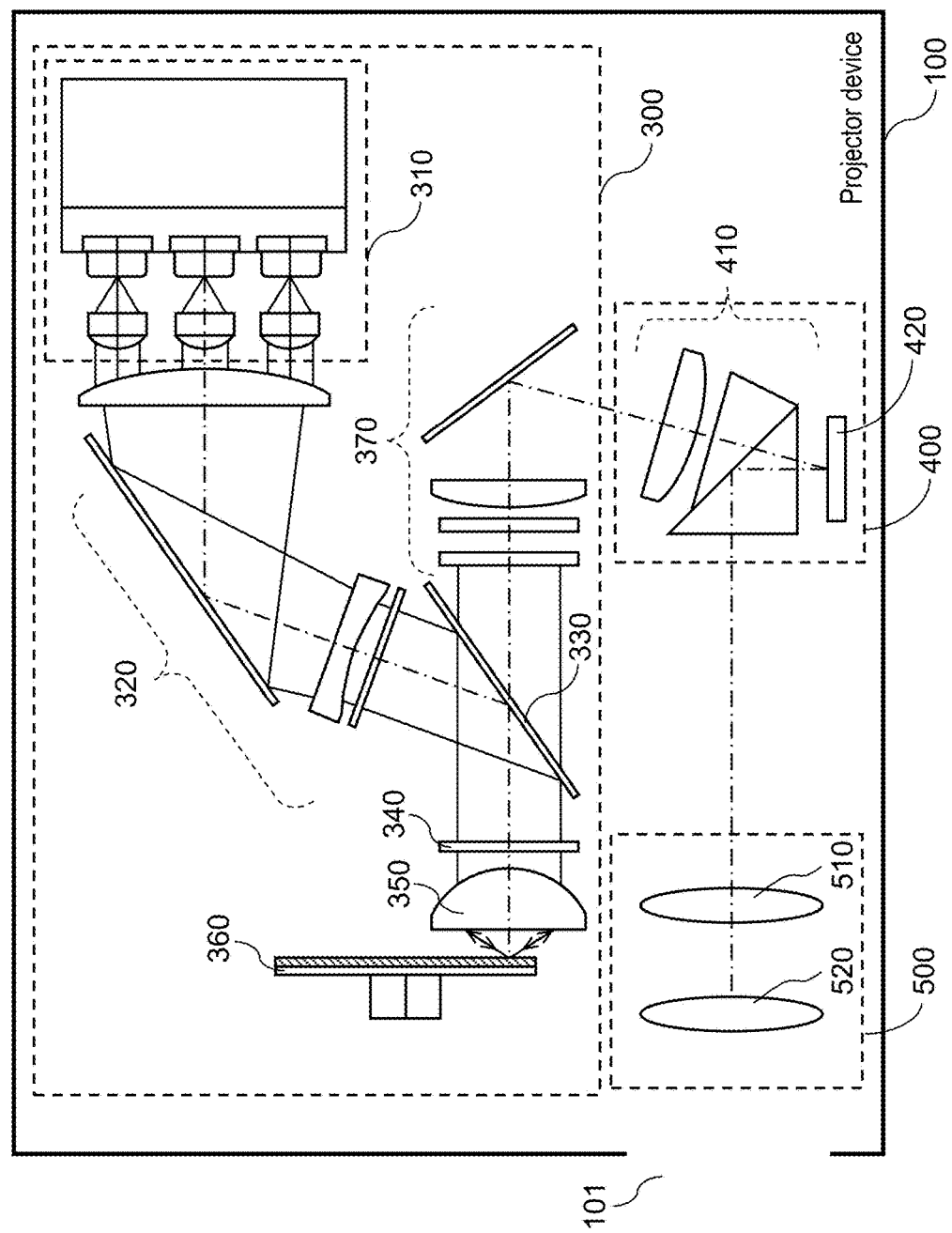
FIG. 5 is a block diagram illustrating an optical configuration of the projector device.

Next, an optical configuration of projector device 100 will be described. Specifically, the configurations of light source unit 300, image generation unit 400, and projection optical system 500 in projector device 100 will be described. FIG. 5 is a block diagram illustrating the optical configuration of projector device 100. As illustrated in FIG. 5, light source unit 300 supplies light necessary for generating a projection image to image generation unit 400. Image generation unit 400 supplies the generated image to projection optical system 500. Projection optical system 500 performs optical conversion, such as focusing or zooming, to the image supplied from image generation unit 400. Projection optical system 500 faces opening 101, and projects the image through opening 101.

The configuration of light source unit 300 will be described. As illustrated in FIG. 5, light source unit 300 includes semiconductor laser 310, dichroic mirror 330, λ/4 plate 340, phosphor wheel 360, and the like.

Semiconductor laser 310 is a solid light source that emits S polarized blue light with wavelength of 440 nm to 455 nm, for example. The S polarized blue light emitted from semiconductor laser 310 is incident on dichroic mirror 330 through light guide optical system 320.

For example, dichroic mirror 330 is an optical element having high reflectivity equal to or higher than 98% to the S polarized blue light with wavelength of 440 nm to 455 nm, and having high transmittance equal to or higher than 95% to P polarized blue light with wavelength of 440 nm to 455 nm and green light to red light with wavelength of 490 nm to 700 nm regardless of the polarization state. Dichroic mirror 330 reflects S polarized blue light emitted from semiconductor laser 310 toward λ/4 plate 340.

λ/4 plate 340 is a polarization element that converts linearly polarized light into circularly polarized light, or converts circularly polarized light into linearly polarized light. λ/4 plate 340 is disposed between dichroic mirror 330 and phosphor wheel 360. The S polarized blue light incident on λ/4 plate 340 is converted into circularly polarized blue light, and then, emitted to phosphor wheel 360 through lens 350.

Phosphor wheel 360 is an aluminum flat plate configured to be rotatable with high speed. A plurality of B regions which is a region of a diffusion reflection surface, a plurality of G regions on which a phosphor emitting green light is applied, and a plurality of R regions on which a phosphor emitting red light is applied are formed on the surface of phosphor wheel 360. Circularly polarized blue light emitted to B region of phosphor wheel 360 is diffused and reflected to be again incident on λ/4 plate 340 as circularly polarized blue light. The circularly polarized blue light incident on λ/4 plate 340 is converted into P polarized blue light, and then, enters again dichroic mirror 330. In this case, the blue light entering dichroic mirror 330 is P polarized light. Therefore, this blue light passes through dichroic mirror 330, and enters image generation unit 400 through light guide optical system 370.

Blue light or red light emitted to G region or R region of phosphor wheel 360 excites the phosphor applied on G region or R region to emit green light or red light. The green light or red light emitted from G region or R region is incident on dichroic mirror 330. In this case, the green light or red light entering dichroic mirror 330 passes through dichroic mirror 330, and enters image generation unit 400 through light guide optical system 370.

Since phosphor wheel 360 rotates with high speed, blue light, green light, and red light are emitted from light source unit 300 to image generation unit 400 in a time-shared manner.

Image generation unit 400 generates a projection image according to the video signal supplied from controller 210. Image generation unit 400 includes DMD (Digital-Mirror-Device) 420, and the like. DMD 420 is a display element having multiple micromirrors arrayed on a flat plane. DMD 420 deflects each of the arrayed micromirrors to spatially modulate the incident light according to the video signal supplied from controller 210. Light source unit 300 emits blue light, green light, and red light in a time-shared manner. DMD 420 sequentially and repeatedly receives blue light, green light, and red light, which are emitted through light guide optical system 410 in a time-shared manner. DMD 420 deflects each of the micromirrors in synchronization with the timing at which light of each color is emitted. Thus, image generation unit 400 generates a projection image according to the video signal. According to the video signal, DMD 420 deflects each of the micromirrors for light that directs to projection optical system 500 and light that directs to a region outside an effective range of projection optical system 500. With this, image generation unit 400 can supply the generated projection image to projection optical system 500.

Projection optical system 500 includes optical components such as zoom lens 510 and focusing lens 520. Projection optical system 500 enlarges the light incident from image generation unit 400, and projects this light onto the projection plane. Controller 210 adjusts the position of zoom lens 510, thereby being capable of controlling a projection region of an object to be projected to have a desired zoom value. To increase the zoom value, controller 210 moves zoom lens 510 to the direction in which the angle of view becomes narrow to reduce the projection region. On the other hand, to decrease the zoom value, controller 210 moves zoom lens 510 to the direction in which the angle of view becomes wide to increase the projection region. Controller 210 also adjusts the position of focusing lens 520 to follow the movement of zoom lens 510 based on predetermined zoom tracking data, thereby being capable of adjusting focus of the projection image.

The configuration of DLP (Digital-Light-Processing) system using DMD 420 has been described above as one example of projector device 100. However, the present disclosure is not limited thereto. Specifically, a configuration with a liquid crystal system may be used for projector device 100.

The configuration of a single plate type in which the light source using phosphor wheel 360 is time-shared has been described above as one example of projector device 100. However, the present disclosure is not limited thereto. Specifically, a configuration of a three plate type having light sources for blue light, green light, and red light may be used for projector device 100.

The configuration in which the light source for blue light for generating a projection image and the light source for infrared light for measuring a distance are different units has been described above. However, the present disclosure is not limited thereto. Specifically, the light source for blue light for generating a projection image and the light source for infrared light for measuring a distance may be combined into one unit. If a three plate type is used, the light source for each color and the light source for infrared light may be combined into one unit.

[1-3. Operation]

The operation of projector device 100 having the above configuration will be described below. Projector device 100 according to the present exemplary embodiment can detect a person as a specific object, and project a predetermined image at a position having a predetermined positional relation with the position of the person (e.g., the position 1 m ahead of the position of the detected person in the moving direction) by following the motion of the detected person.

Specifically, distance detection unit 230 emits infrared detection light toward a certain region (e.g., an entrance of a shop or building) to acquire distance information in this region. Controller 210 detects a person, and the position, moving direction, speed, and the like of the person, based on the distance information acquired by distance detection unit 230. Notably, the moving direction and speed are detected from distance information with a plurality of frames. Controller 210 determines the position on which the projection image is to be projected based on the position and moving direction of the detected person. Controller 210 moves projector body 100b in the pan direction or tilt direction by controlling drive unit 110 to project the projection image on the determined position. Controller 210 detects the position of the person at predetermined intervals (e.g., 1/60 second), and projects an image such that the projection image follows the person, based on the position of the detected person.

Figure 6:
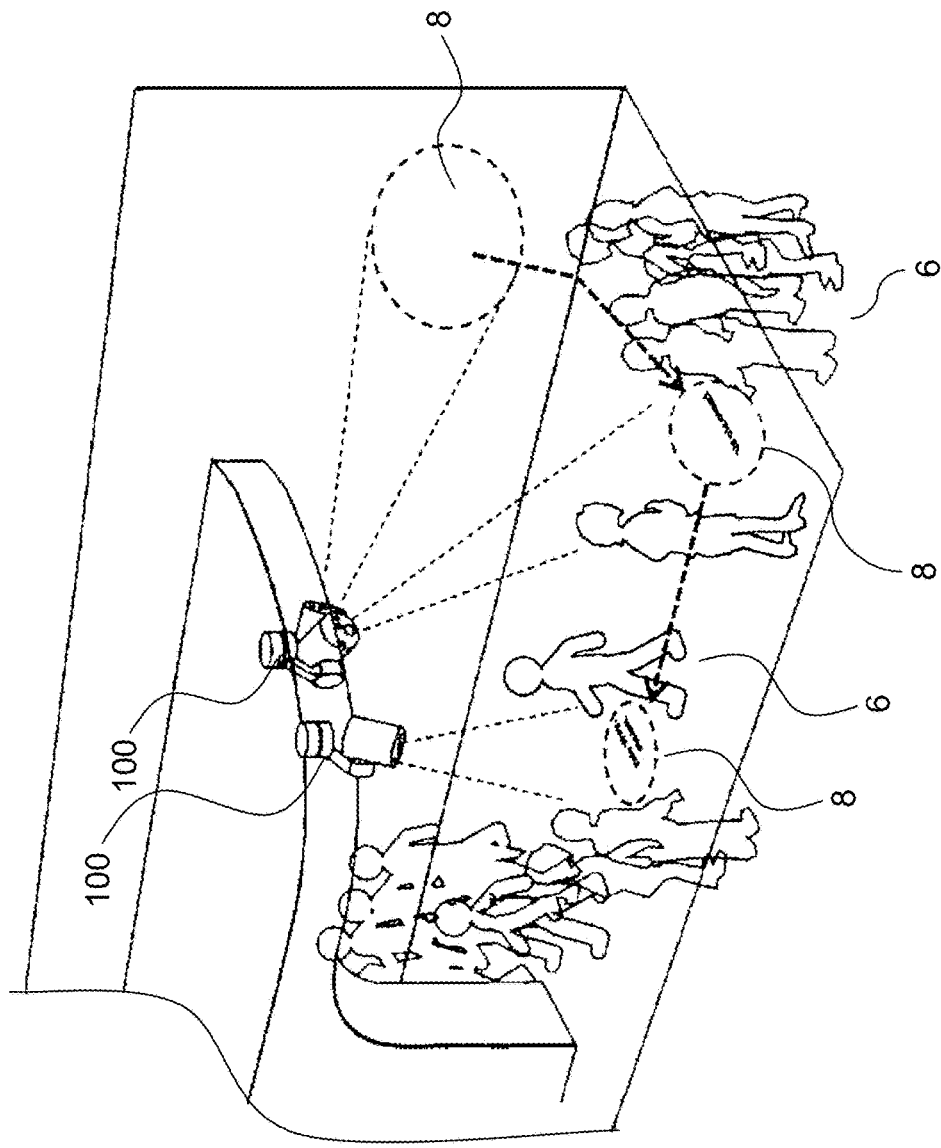
FIG. 6 is a diagram for describing an example of use of the projector device.

For example, projector device 100 is installed on a ceiling or wall of a passageway or hall in a building, and when detecting person 6, projector device 100 projects projection image 8 by following the motion of person 6 as illustrated in FIG. 6. For example, projection image (content image) 8 includes a graphic such as an arrow or a message for guiding or leading person 6 to a predetermined place or shop, a welcome message for person 6, an advertising text, and a graphic or image for creating an impressive presentation for a movement of person 6, such as a red carpet. Projection image 8 may be a still image or a moving image. With this configuration, projector device 100 can present desired information to detected person 6 at a position where person 6 can easily see the information according to the motion of detected person 6, thereby being capable of surely notifying person 6 of the desired information.

Next, a problem occurring when two or more projector devices 100 projecting an image according to the person following control described above are installed will be described.

When two or more projector devices 100 are installed, each projector detects a person, and displays each image by following the detected person. In this case, an image projected by one projector and an image projected by another projector may be projected in an overlapping manner depending on the position of the person followed by each projector. When the projected images are overlapped, the content of the images is difficult to be seen, which entails a problem such that the information shown by the images cannot correctly be transmitted to a person for which the image is desired to be presented.

In view of this, projector device 100 according to the present disclosure controls an image projection method to prevent images from being overlapped with each other, when there is a possibility in which an image projected by a subject projector device is projected as being overlapped with an image projected by another projector device. This control prevents the situation in which it is hard to see the image projected by the subject projector device, because it is overlapped with an image projected by another projector device.

Figure 7:
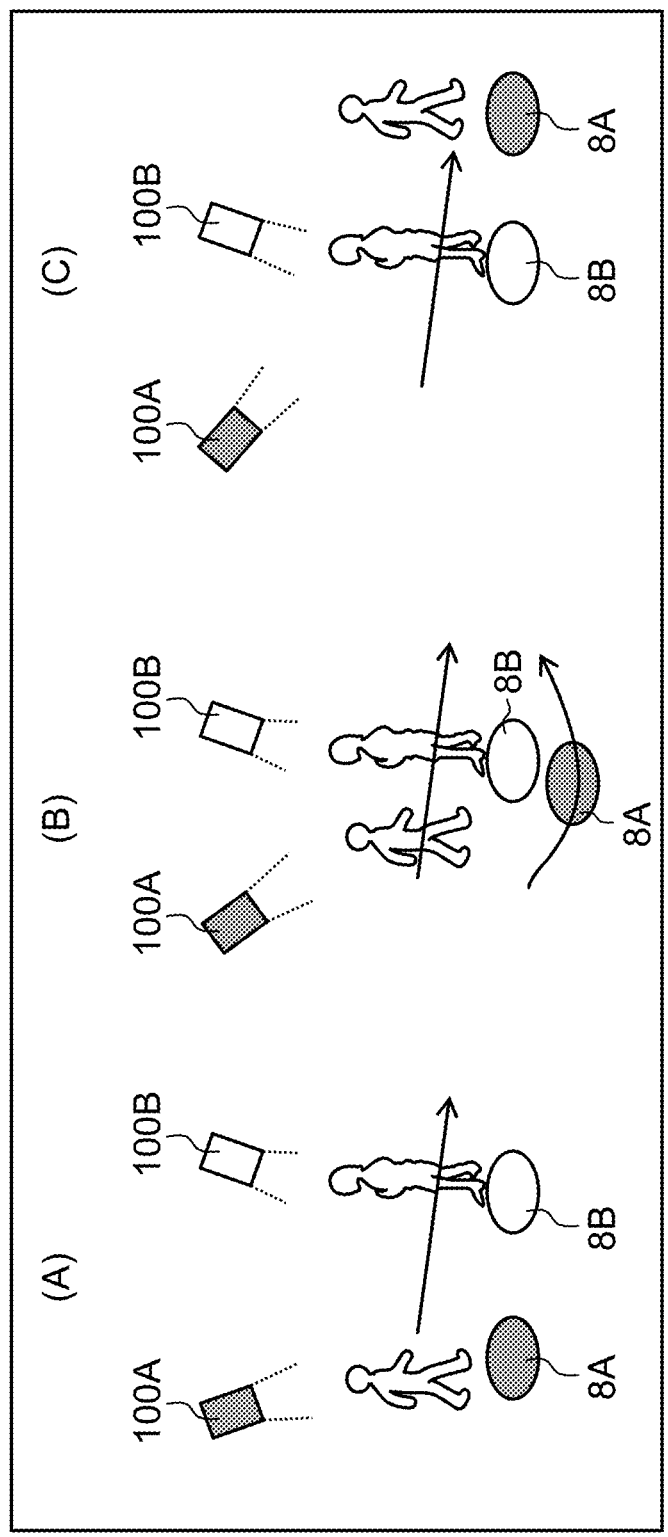
FIG. 7 is a diagram for describing a collision avoidance operation using detour of an image with the projector device according to a first exemplary embodiment.

Specifically, as illustrated in FIG. 7, when projection images 8A and 8B projected from projector devices 100A and 100B become close to each other and are about to be overlapped with each other, one projector device 100A makes projection image 8A detour around projection image 8B projected from the other projector device 100B in order from FIGS. 7(A), (B), and (C). With this, projection image 8A and projection image 8B are not overlapped with each other. An avoidance operation using detour as illustrated in FIG. 7 will be described below.

Figure 8:
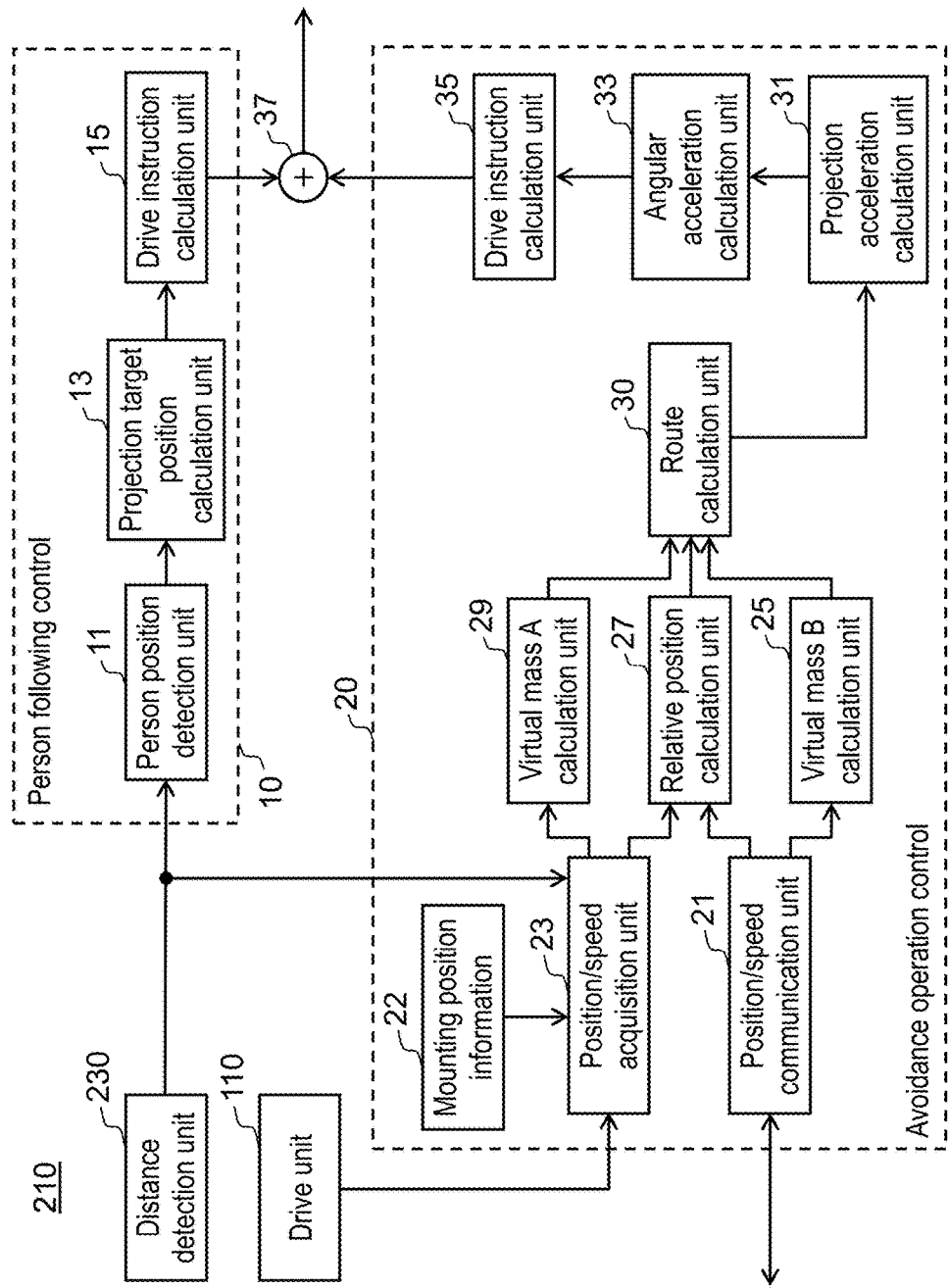
FIG. 8 is a block diagram illustrating a functional configuration of the controller for performing the avoidance operation using detour of an image in the first exemplary embodiment.

FIG. 8 is a diagram illustrating a functional configuration of controller 210 for implementing the avoidance operation using detour. Controller 210 includes control block 10 performing the person following control, and control block 20 performing a control for the avoidance operation. Controller 210 adds a drive instruction (voltage) generated by control block 10 and a drive instruction (voltage) generated by control block 20 at addition unit 37 to generate a final drive instruction (voltage), and outputs this drive instruction (voltage) to drive unit 110 to drive unit 110.

Firstly, the operation of control block 10 generating the drive instruction for the person following control will be described. Note that a position and a speed are a two-dimensional vector having a size and a direction in the following description.

Person position detection unit 11 detects a person from distance information (distance image) from distance detection unit 230. A person is detected in such a manner that a characteristic amount indicating a person is stored beforehand in memory 220, and an object having this characteristic amount is detected from the distance information (distance image). Person position detection unit 11 also calculates a position of the detected person (relative position). The "relative position" here means a position on a coordinate system with the position of drive unit 110 being specified as a center. Projection target position calculation unit 13 calculates a target projection position (relative position) of a projection image with the position of the detected person being specified as a reference. For example, the position apart from the position of the detected person by a predetermined distance (e.g., 1 m) in the moving direction is calculated as the target projection position. Drive instruction calculation unit 15 calculates a drive instruction (voltage) for driving drive unit 110 so as to allow the direction of projector device 100 to match the direction in which the projection image from projector device 100 is projected on the target projection position (relative position).

Next, the operation of control block 20 generating a drive instruction for the avoidance operation will be described. Position/speed communication unit 21 communicates with the other projector device to receive information relating to the projection position (absolute position), size, and moving speed of the image currently projected by the other projector device. The "absolute position" means a position on an absolute coordinate system showing an entire space including two or more projector devices. Position/speed communication unit 21 transmits information relating to the projection position, size, and moving speed of the image projected by the subject projector device to the other projector device.

Virtual mass B calculation unit 25 calculates the virtual mass of the projection image based on the moving speed of the projection image projected by the other projector device at the projection position. The virtual mass is calculated such that, the higher the speed is, the smaller the virtual mass becomes. Virtual mass (m) can be calculated from the following equation.

Virtual mass $(m)$=Coefficient $(K)$/Moving projection speed $(v)$ of image

Position/speed acquisition unit 23 acquires distance information from distance detection unit 230. Position/speed acquisition unit 23 also acquires information relating to the position (position in the pan/tilt direction) and the drive speed of drive unit 110 from drive unit 110. Position/speed acquisition unit 23 calculates the projection position (absolute position) and the moving speed of the image currently projected by the subject projector device based on the information pieces respectively acquired from distance detection unit 230 and drive unit 110 and mounting position information 22 showing the position (absolute position) on which drive unit 110 is mounted. Mounting position information 22 is stored in memory 220.

Relative position calculation unit 27 acquires the position of the projection image projected by the other projector device from position/speed communication unit 21. Relative position calculation unit 27 calculates a relative positional relation (relative position, distance) between the projection image projected by the other projector device and the projection image projected by the subject projector device based on the position (absolute position) of the projection image projected by the other projector device and the calculated position (absolute position) of the projection image projected by subject projector device 100.

Virtual mass A calculation unit 29 calculates the virtual mass of the projection image projected by the subject projector device based on the moving speed of the projection image projected by the subject projector device at the current projection position.

Figure 9:
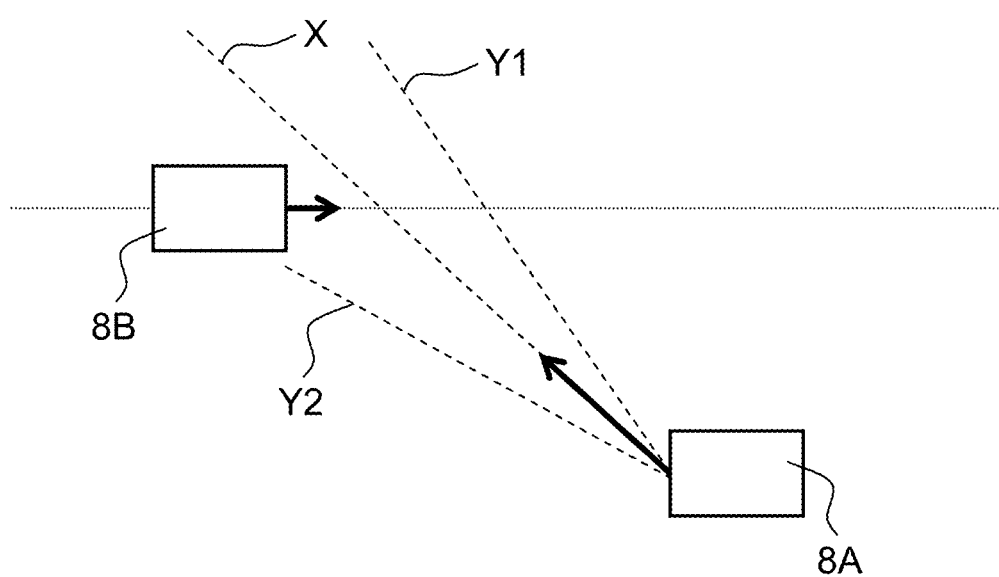
FIG. 9 is a diagram for describing a change (detour) of a projection route of an image.

Route calculation unit 30 calculates a projection route of the projection image projected by the subject projector device based on the mass from virtual mass A calculation unit 29, the mass from virtual mass B calculation unit 25, and the positional relation from relative position calculation unit 27. Route calculation unit 30 compares the virtual mass of the projection image projected by the subject projector device and the virtual mass of the projection image projected by the other projector device. When the virtual mass of the projection image projected by the subject projector device is smaller than the virtual mass of the projection image projected by the other projector device as a result of the comparison, route calculation unit 30 determines that the projection image projected by the subject projector device is moved on a detour route, and calculates the detour route. The calculation of the detour route will be described with reference to FIG. 9.

The calculation of the detour route for projection image 8A based on projection image 8A projected by the subject projector device and projection image 8B projected by the other projector device will be described. Right-shifted trajectory Y1 and left-shifted trajectory Y2, which are shifted at the same angle from original trajectory X of projection image 8A according to the person following control, are set. Whether a collision of image will occur or not is evaluated for these trajectories Y1 and Y2. Specifically, it is determined whether projection image 8A will collide or not against projection image 8B when projection image 8A traces each of trajectories Y1 and Y2. The route (trajectory) on which the collision will not occur is selected. If collision will occur on both of right trajectory Y1 and left trajectory Y2, the evaluation is again performed with the avoidance angle being enlarged further. The avoidance angle is set to be a small value at the beginning, and is increased in a stepwise manner if a trajectory by which collision can be avoided cannot be determined. With this, an avoidance trajectory can be determined with as small avoidance angle as possible, whereby an avoidance trajectory having less speed change (acceleration) can be determined.

Returning to FIG. 8, projection acceleration calculation unit 31 calculates acceleration of the projection image based on the information about the route calculated by route calculation unit 30. Angular acceleration calculation unit 33 calculates angular acceleration relating to the drive of drive unit 110 from the acceleration of the projection image. Then, drive instruction calculation unit 35 calculates a drive instruction (voltage) for driving drive unit 110 based on the angular acceleration. In this way, the drive instruction relating to the drive of drive unit 110 for the avoidance operation is calculated by control block 20.

Addition unit 37 adds the drive instruction (voltage) generated by control block 10 for the person following control and the drive instruction (voltage) generated by control block 20 for the avoidance operation to generate a drive instruction (voltage) to drive unit 110, and outputs this drive instruction. Drive unit 110 swings in the pan direction or tilt direction based on the drive instruction (voltage). With this, projector device 100 can project a projection image by following a person in such a manner that the projection image from the subject projector device is not overlapped with a projection image from the other projector device.

[1-4. Effect, Etc.]

As described above, projector device 100 according to the present exemplary embodiment is a projection device projecting an image, and includes: person position detection unit 11 configured to detect a specific object; projection unit (image generation unit 400, projection optical system 500) configured to project a first projection image; drive unit 110 configured to change the direction of the projection unit so as to change the projection position of the first projection image; controller 210 configured to control the drive unit 110 to project the first projection image by following the motion of the detected specific object; and communication unit 240 configured to receive information of a second projection image projected by the other projection device.

Controller 210 acquires information relating to the position of the second projection image through communication unit 240, and controls a projection method of the first projection image (in the present example, a route of a projection image) such that the first projection image and the second projection image are not projected as being overlapped with each other based on the positions of the first projection image and the second projection image.

With the above configuration, even when two or more projector devices performing a person following control to a detected person are installed, the projector device can project an image so as not to be overlapped with images of the other projector devices, whereby information can surely be transmitted to the detected person.

Second Exemplary Embodiment

Another example of the projection method for preventing projection images from being projected as being overlapped with each other will be described. In the present exemplary embodiment, two projection images are moved in such a manner that repulsive force inversely proportional to the distance between two projection images is applied to the two projection images for preventing two projection images from being overlapped with each other.

Figure 10:
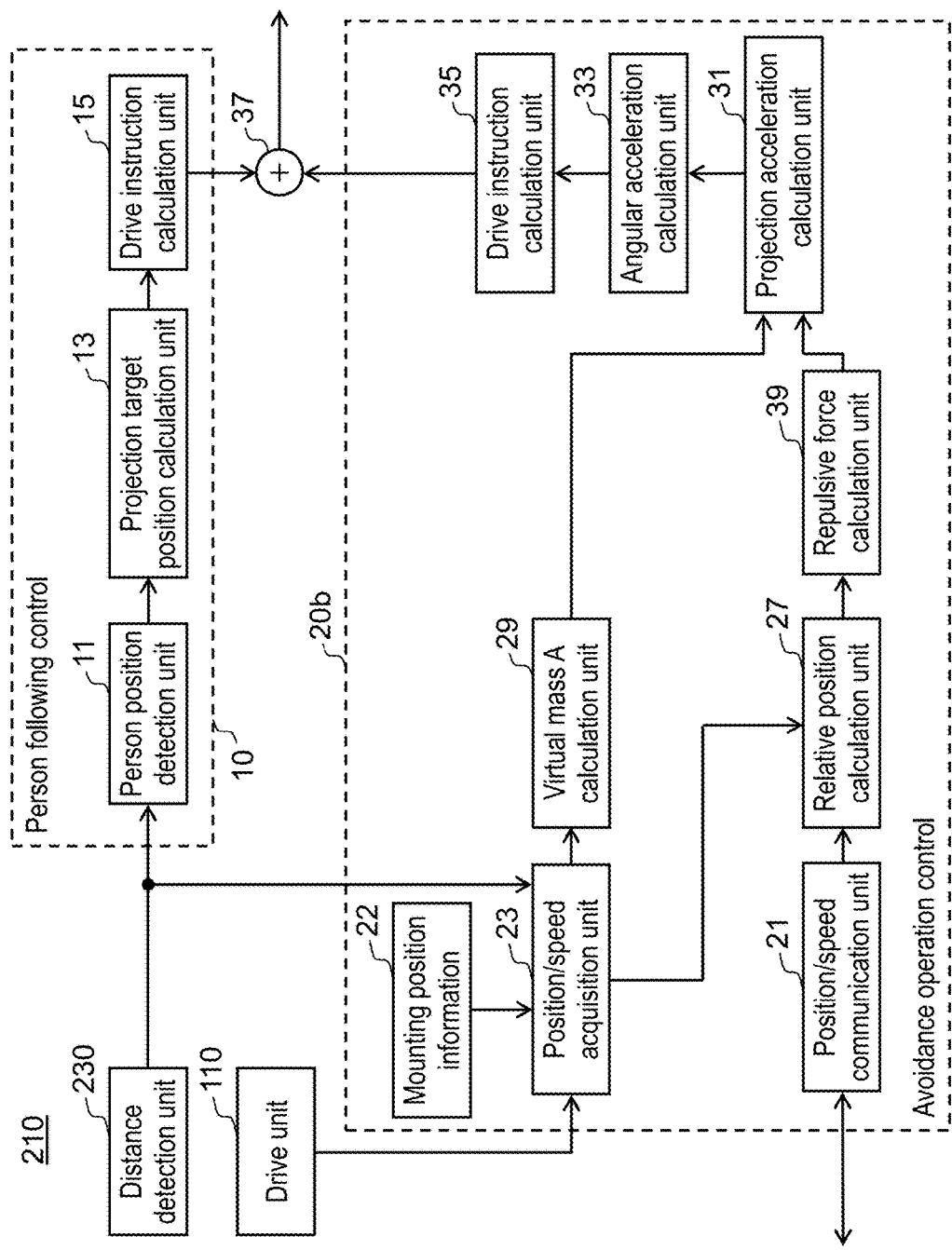
FIG. 10 is a block diagram illustrating an example of a functional configuration of a controller for performing an avoidance operation using repulsive force between images according a second exemplary embodiment.

FIG. 10 is a diagram illustrating a functional configuration of controller 210 for implementing an avoidance operation using repulsive force in the direction in which images are away from each other. The configuration and operation of control block 10 for the person following control in controller 210 are similar to those described in the first exemplary embodiment, so that the descriptions for these will not be repeated. The configuration and operation of control block 20b for the avoidance operation will be described below.

In controller 20b, position/speed acquisition unit 23 calculates the projection position (absolute position), size, and moving speed of the image currently projected by the subject projector device based on the information pieces respectively acquired from distance detection unit 230 and drive unit 110 and mounting position information 22 showing the position on which drive unit 110 is mounted. Position/speed communication unit 21 receives information relating to the projection position (absolute position), size, and moving speed of the image currently projected by the other projector device from the other projector device.

Relative position calculation unit 27 receives the position (absolute position) and size of the projection image projected by the subject projector device from position/speed acquisition unit 23, and receives the position (absolute position) and size of the projection image projected by the other projector device from position/speed communication unit 21. In this case, the position of the projection image projected by the other projector device is represented by an absolute position. Relative position calculation unit 27 calculates a relative positional relation between the projection image of the other projector device and the projection image of the subject projector device based on the position (absolute position) of the projection image of the other projector device and the current position (absolute position) of the projection image of the subject projector device. For example, the position of one of the projection images is used as a reference (origin) to obtain the relative position of the other projection image.

Repulsive force calculation unit 39 calculates the distance based on the relative position between the projection image projected by the other projector device and the projection image projected by the subject projector device, and calculates repulsive force (repelling force) exerted on the projection image projected by the subject projector device based on the calculated distance. The repulsive force is calculated such that, the larger the distance between the projection image projected by the other projector device and the projection image projected by the subject projector device becomes, the smaller the repulsive force becomes. For example, repulsive force can be calculated as a value inversely proportional to the distance or the square of the distance between the projection image projected by the other projector device and the projection image projected by the subject projector device. With the calculation of repulsive force as described above, large repulsive force is applied to the projection image when the distance between the projection images becomes small. Accordingly, when two projection images are very close to each other, large repulsive force is applied to the projection image, and the projection image is displayed to move in the direction away from the other projection image. Notably, the distance between two projection images is calculated in consideration of the sizes of the projection images.

Projection acceleration calculation unit 31 calculates acceleration (=force/mass) of the projection image from the repulsive force from repulsive force calculation unit 39 and the mass from virtual mass A calculation unit 29.

Angular acceleration calculation unit 33 calculates angular acceleration relating to the drive of drive unit 110 from the acceleration calculated by projection acceleration calculation unit 31. Drive instruction calculation unit 35 calculates a drive instruction (voltage) for driving drive unit 110 based on the angular acceleration calculated by angular acceleration calculation unit 33. In this way, the drive instruction relating to the drive of drive unit 110 for the avoidance operation is calculated by control block 20b.

Addition unit 37 adds the drive instruction (voltage) generated by control block 10 for the person following control and the drive instruction (voltage) generated by control block 20b for the avoidance operation to generate a drive instruction (voltage) to drive unit 110, and outputs this drive instruction.

As described above, virtual repulsive force of a projection image is applied to control a trajectory, whereby two projection images can be moved in the direction in which two projection images are separated from each other, before they are about to collide against each other, and therefore, the overlapped display of the projection images can be prevented.

Third Exemplary Embodiment

Figure 11:
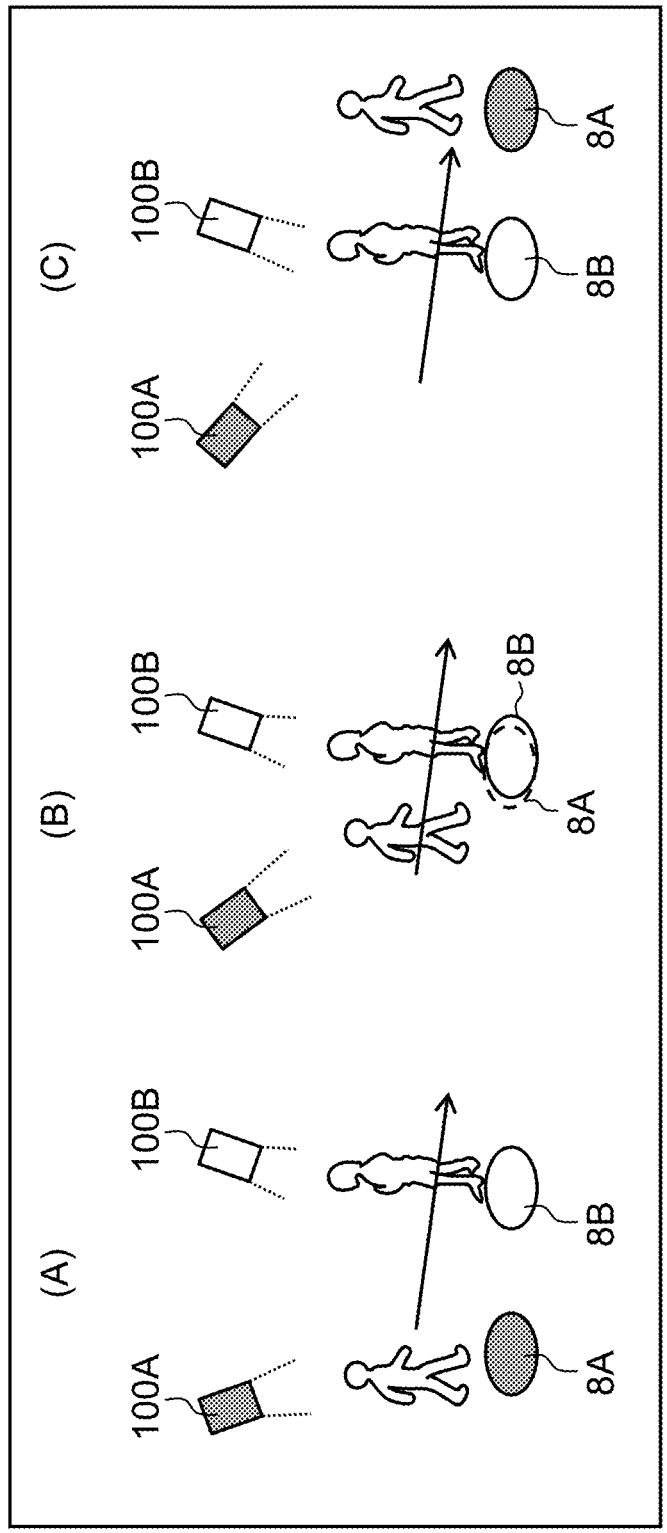
FIG. 11 is a diagram describing a collision avoidance operation using erasure of image with a projector device according to a third exemplary embodiment.

Still another example of the projection method for preventing projection images from being projected as being overlapped with each other will be described. FIG. 11 is a diagram for describing an avoidance operation in the present exemplary embodiment. In the present exemplary embodiment, when two projection images 8A and 8B are about to be overlapped with each other, an overlapped part of projection image 8A is erased (see FIG. 11(B)) to prevent the projection images 8A and 8B from being overlapped with each other.

Figure 12:
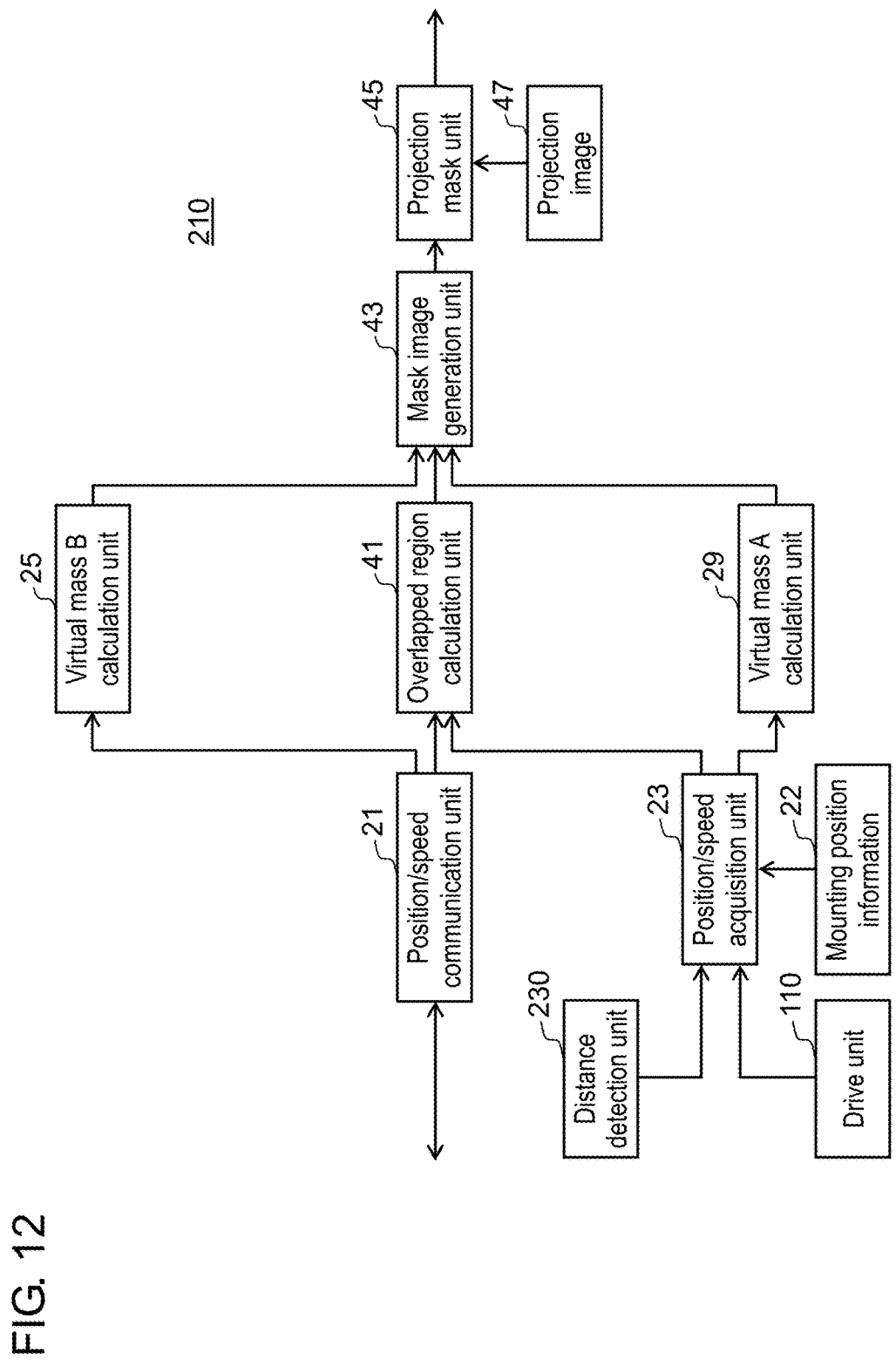
FIG. 12 is a block diagram illustrating an example of a functional configuration of a controller for performing the avoidance operation using erasure of image according the third exemplary embodiment.

FIG. 12 is a functional block diagram of controller 210 for implementing the avoidance operation of erasing the overlapped part of projection images 8A and 8B. The configuration (control block 10) and operation for the person following control in controller 210 are similar to those described above, so that the descriptions for these will not be repeated. FIG. 12 illustrates the functional configuration of controller 210 relating to the function for an editing process of a projection image. The avoidance operation according to the present exemplary embodiment will be described below.

Position/speed acquisition unit 23 acquires distance information from distance detection unit 230. Position/speed acquisition unit 23 also acquires information relating to the position (position in the pan/tilt direction) and the drive speed of drive unit 110 from drive unit 110. Position/speed acquisition unit 23 calculates the projection position and size of the image currently projected by the subject projector device based on the information pieces respectively acquired from distance detection unit 230 and drive unit 110 and mounting position information 22 showing the position (absolute position) on which drive unit 110 is mounted. Position/speed communication unit 21 receives the projection position and size of the image currently projected by the other projector device from the other projector device.

Virtual mass B calculation unit 25 calculates the virtual mass of the projection image projected by the other projector device based on the moving speed of the projection image from the other projector device at the projection position.

Overlapped region calculation unit 41 receives the position and size of the projection image from the other projector device from position/speed communication unit 21. Overlapped region calculation unit 41 calculates the overlapped region based on the position and size of the projection image projected by the other projector device and the current position and size of the projection image projected by the subject projector device.

Virtual mass A calculation unit 29 calculates the virtual mass of the projection image projected by the subject projector device based on the moving speed of the projection image projected by the subject projector device at the current projection position.

Mask image generation unit 43 generates a mask image based on the mass of the projection image from the subject projector device, the mass of the projection image from the other projector device, and the overlapped region from overlapped region calculation unit 41. Specifically, mask image generation unit 43 compares the mass of the projection image projected by the subject projector device and the mass of the projection image projected by the other projector device. When the mass of the projection image from the subject projector device is smaller, mask image generation unit 43 generates a mask image for erasing the overlapped part of the projection image projected by the subject projector device. On the other hand, when the projection image of the subject projector device is heavier, mask image generation unit 43 generates a mask image that entirely transmits the projection image from the subject projector device. Notably, the mask image is an image for selecting whether the projection image is transmitted or erased for each pixel.

Projection mask unit 45 masks and projects an image (video signal) by using a mask image.

With the above method, when two projection images are overlapped with each other, these images are projected such that the overlapped part of one projection image is erased. This can prevent these images from being displayed as being overlapped with each other.

In the above example, the image having smaller virtual mass, i.e., the fast-moving projection image is erased, and the slow-moving projection image is not erased. A content of a fast-moving projection image is harder to be recognized than a content of a slow-moving projection image. Therefore, the fast-moving projection image is erased from the viewpoint of visibility. However, the projection images may be displayed such that the overlapped part of the slow-moving projection image is erased.

Fourth Exemplary Embodiment

Still another example of the projection method for preventing projection images from being projected as being overlapped with each other will be described. The present exemplary embodiment describes a method of projecting a projection image without being hindered by an obstacle, in the case where an obstacle interfering with projection is placed on a projection plane such as a floor surface when the projection image is to be projected on the projection plane.

Specifically, in the case where an obstacle interfering with projection is placed on a projection plane, such as a floor surface, on which a projection image is to be projected, the size of the projection image is reduced in order that the projection image is projected not on the obstacle but on a flat region with no obstacle on the projection plane.

Figure 13:
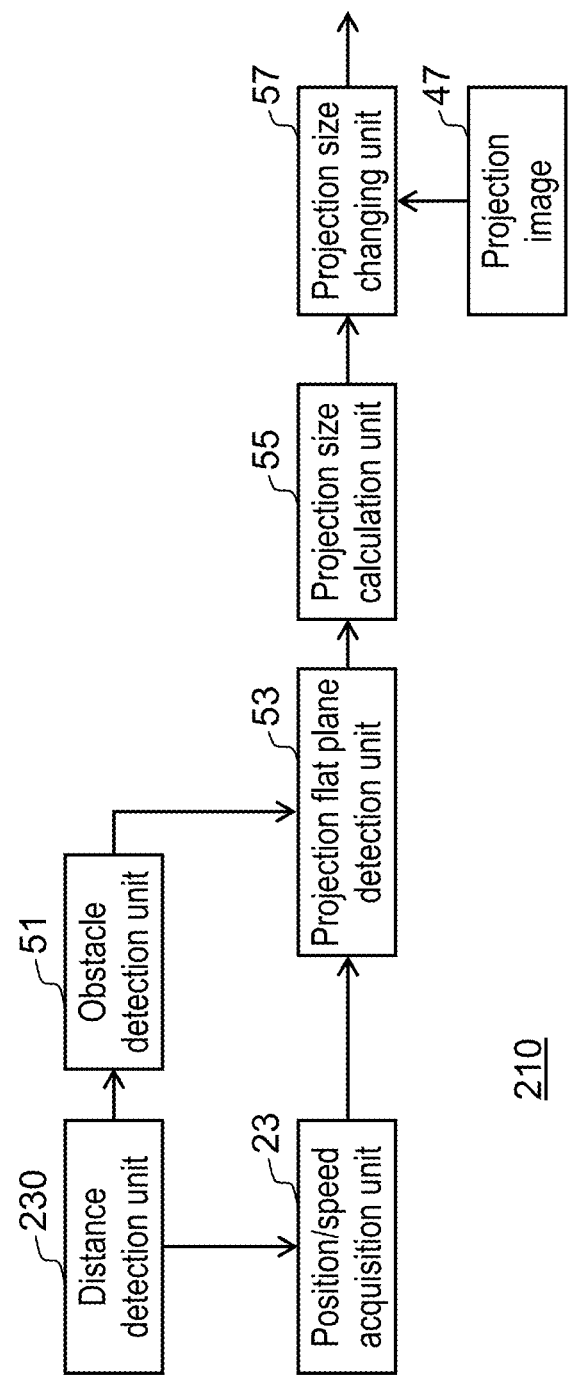
FIG. 13 is a block diagram illustrating an example of a functional configuration of a controller for performing an obstacle avoidance operation with a change in an image size according to a fourth exemplary embodiment.

FIG. 13 is a diagram illustrating a functional configuration of controller 210 for implementing an operation for changing a size of a projection image. The configuration and operation of control block 10 in controller 210 for projecting an image by following a person are similar to those described above, so that the descriptions for these will not be repeated. FIG. 13 illustrates the functional configuration of controller 210 relating to the function for an editing process of a projection image.

Obstacle detection unit 51 detects where there is an obstacle or not from the distance information from distance detection unit 230. An obstacle is an object that blocks an arrival of projection light on a projection plane for a projection image. Obstacle detection unit 51 detects an object other than "person" detected as a specific object as an obstacle from distance information.

Position/speed acquisition unit 23 calculates the projection position of the image currently projected by the subject projector device based on the distance information from distance detection unit 230.

Projection flat plane detection unit 53 receives the position of the projection image currently projected by the subject projector device and the position of the obstacle detected by obstacle detection unit 51. Projection flat plane detection unit 53 detects a flat plane region, i.e., a region with no obstacle (hereinafter referred to as a "free region") around the projection position of the current projection image by referring to the position information of the obstacle. Projection size calculation unit 55 calculates the size of the flat plane region, i.e., the region with no obstacle.

Projection size changing unit 57 adjusts the size of projection image 47 such that projection image 47 can be projected in the region calculated as the flat plane region, i.e., the region with no obstacle.

With the above method, even when an obstacle interfering with projection is placed on a projection plane, the obstacle interfering with projection is avoided and an image can be projected. Accordingly, a projection image that is easily visible can be displayed.

Other Exemplary Embodiments

As described above, the first to fourth exemplary embodiments have been described above as an illustration of the technique disclosed in the present application. However, the technique in the present disclosure is not limited to these, and can be applied to exemplary embodiments in which various changes, replacements, additions, omissions, etc., are made. Furthermore, a new exemplary embodiment can be formed by combining each component described in the first to fourth exemplary embodiments. The other exemplary embodiments will be described below.

(1) Projector device 100 according to the present disclosure is one example of a projection device. Person position detection unit 11 according to the present disclosure is one example of a detection unit that detects a specific object. Image generation unit 400 and projection optical system 500 according to the present disclosure are one example of a projection unit. Drive unit 110 according to the present disclosure is one example of a drive unit that changes the direction of the projection unit. Controller 210 according to the present disclosure is one example of a controller controlling the drive unit. Communication unit 240 according to the present disclosure is one example of a communication unit that receives information of a projection image projected by another projection device.

Figure 14:
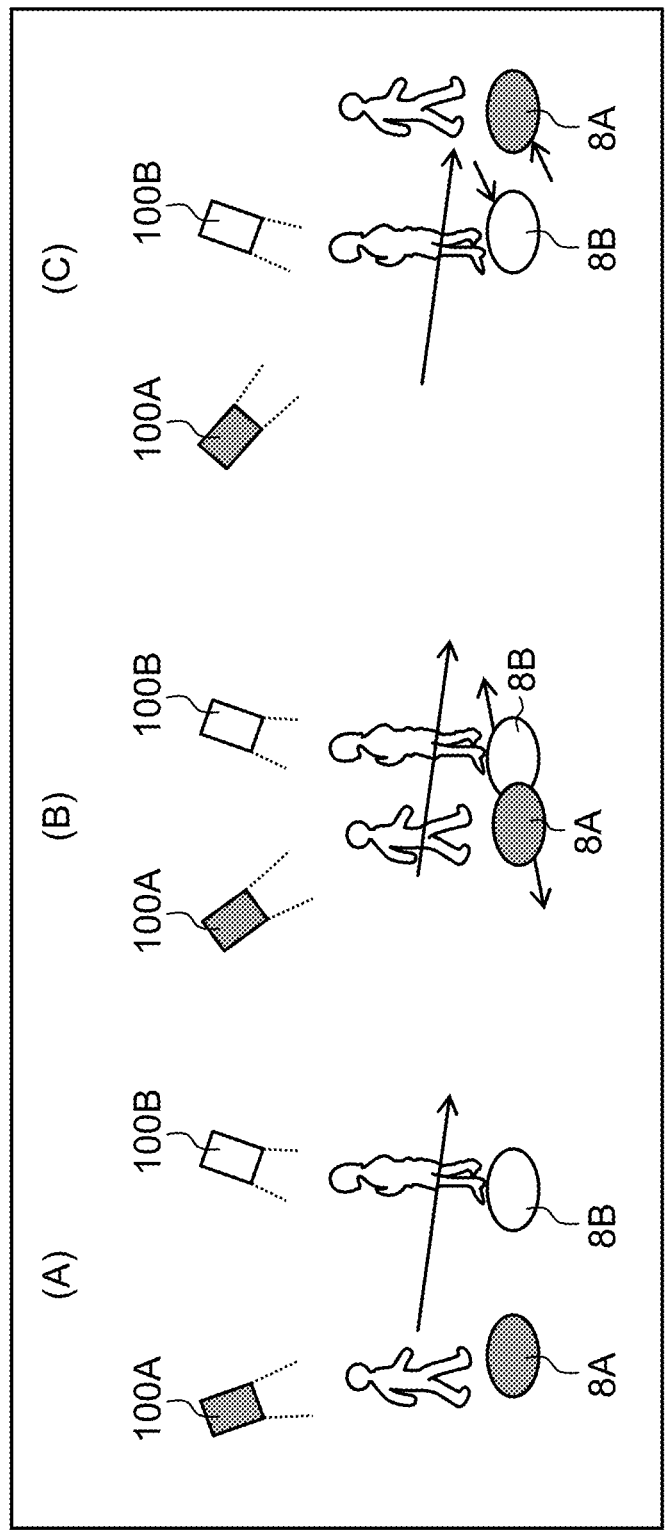
FIG. 14 is a diagram describing a collision avoidance operation using image rebound with a projector device.

(2) As another example of the collision avoidance operation of projection images, a repelling avoidance operation may be performed when two projection images 8A and 8B will collide against each other with the trajectory control according to the person following control as illustrated in FIG. 14. In this case, a rebound coefficient of a projection image is defined beforehand, and stored in memory 220. Controller 210 acquires information of the projection position, speed, and size of the projection image projected by the other projector device from the other projector device. Controller 210 then determines whether or not two projection images will collide against each other based on the positions and sizes of the projection image projected by the subject projector device and the projection image projected by the other projector device. When determining that they will collide against each other, controller 210 calculates a speed caused by the rebound of the projection image projected by the subject projector device in consideration of the rebound coefficient and the moving speed of each of two projection images at the projection position. Controller 210 obtains a drive instruction value of drive unit 110 caused by the rebound based on this speed, and adds the obtained drive instruction value to the drive instruction value according to the person following control, thereby obtaining a final drive instruction value of drive unit 110.

(3) In the above exemplary embodiments, a virtual mass is calculated only based on the moving speed of a projection image at a projection position. However, the method of calculating a virtual mass is not limited thereto. For example, a virtual mass may be calculated in consideration of a spatial frequency of a projection image, instead of or in addition to a moving speed of a projection image at a projection position. Specifically, a virtual mass is calculated such that, the larger the spatial frequency of a projection image becomes, the larger the virtual mass becomes. With this, the avoidance operation is performed to the image having lower spatial frequency in the first exemplary embodiment. In the second exemplary embodiment, the lower the spatial frequency is, the larger acceleration a projection image receives, and therefore, the larger avoidance operation is performed. The higher the spatial frequency is, the finer the content of the image becomes. Therefore, when the image is largely moved, the visibility of this image is deteriorated more than the image with low spatial frequency. Therefore, it is considered that, from the viewpoint of visibility, it is appropriate to largely move an image with lower spatial frequency in the avoidance operation.

(4) In the above exemplary embodiments, an upper limit may be set for acceleration (speed change) of a projection image. Specifically, in FIGS. 8 and 10, when the acceleration calculated by projection acceleration calculation unit 31 reaches the upper limit, the acceleration may be limited to the upper limit. This can reduce a sharp motion of an image.

(5) In the above exemplary embodiments, each projector device acquires information of a projection image projected by the other projector device from the other projector device, and controls the trajectory of the projection image projected by the subject projector device based on the acquired information. On the other hand, a central control device intensively controlling positions of projection images projected by two or more projector devices may be provided. The central control device communicates with each projector device to collect information of a position of a projection image projected by each projector device, calculates a trajectory or size of the image based on the collected information with the above method, and gives an instruction to each projector device.

(6) In the above exemplary embodiments, a person is detected as a specific object, and displays a predetermined image (content) by following a motion of the person. However, the specific object is not limited to a person. For example, the specific object may be a moving subject other than a person, such as an automobile or animal.

(7) In the above exemplary embodiments, distance information is used for detecting a specific object. However, the method of detecting the specific object is not limited thereto. An imaging device that can pick up an image with RGB light may be used instead of distance detection unit 230. A specific object may be detected from the image picked up by the imaging device, and the position and speed of the specific object may further be detected.

(8) The techniques disclosed in the above first to fourth exemplary embodiments can appropriately be combined to one another.

The exemplary embodiments have been described above as illustrative examples of the technique in the present disclosure. The accompanying drawings and the detailed description are provided for this purpose.

Thus, elements appearing in the accompanying drawings and the detailed description include not only those that are essential, but also those that are not essential but are merely used to illustrate the technique disclosed herein. Therefore, those non-essential elements should not immediately be taken as being essential for the reason that they appear in the accompanying drawings and/or in the detailed description.

The exemplary embodiments above are for illustrating the technique disclosed herein, and various changes, replacements, additions, omissions, etc., can be made without departing from the scope defined by the claims and equivalents thereto.

The projection device according to the present disclosure is applicable to various uses for projecting an image onto a projection plane.

What is claimed is:

1. A projection device projecting an image, comprising:
    a detector configured to detect a specific object;
    a projector configured to project a first projection image;
    a driver configured to change a direction of the projector so as to change a projection position of the first projection image;
    a controller configured to control the driver such that the first projection image is projected while following the motion of the specific object detected by the detector; and a communication device configured to receive information of a second projection image projected by another projection device, wherein the controller acquires information relating to a position of the second projection image through the communication device, and calculates a first characteristic value and a second characteristic value, the first characteristic value characterizing the first projection image and the second characteristic value characterizing the second projection image, wherein the controller calculates a rebound speed of the first projection image rebounding from the second projection image based on each of the first characteristic value and the second characteristic value when the controller determines that the first projection image and the second projection image will collide against each other, and controls the driver based on a speed of the first projection image to which the calculated rebound speed of the first projection image is added.

2. The projection device according to claim 1, wherein each of the first characteristic value and the second characteristic value are a moving speed of the first projected image before rebounding from the second projected image and a moving speed of the second projected image before rebounding from the first projected image respectively.

3. The projection device according to claim 2, wherein the controller calculates the rebound speed based on a rebound coefficient provided to the controller, the moving speed of the first projected image before rebounding from the second projection image and the moving speed of the second projected image before rebounding from the first projected image.

4. The projection device according to claim 3, wherein each of the first characteristic value and the second characteristic value are a moving speed of the projection image, wherein a characteristic value of the projection image moving at a higher speed than a moving speed of the other projection image is larger than a characteristic value of the other projection image.

5. The projection device according to claim 3, wherein the characteristic value is a spatial frequency of the projection image, wherein a characteristic value of the projection image having a lower spatial frequency than a frequency of the other projection image is smaller than a characteristic value of the other projection image.

* * * * *